US012666237B2

(12) United States Patent
Musgrove et al.

(10) Patent No.: US 12,666,237 B2
(45) Date of Patent: Jun. 23, 2026

(54) EVENT-BASED WIRELESS EMERGENCY ALERTS

(71) Applicant: AT&T Intellectual Property I, L.P., Atlanta, GA (US)

(72) Inventors: Charles Peter Musgrove, Henderson, NV (US); Brian Daly, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 619 days.

(21) Appl. No.: 17/955,601

(22) Filed: Sep. 29, 2022

(65) Prior Publication Data

US 2024/0114326 A1     Apr. 4, 2024

(51) Int. Cl.
    *H04W 4/90*        (2018.01)
    *G08B 7/06*        (2006.01)
    *H04W 68/00*       (2009.01)

(52) U.S. Cl.
    CPC ............... *H04W 4/90* (2018.02); *G08B 7/06* (2013.01); *H04W 68/00* (2013.01)

(58) Field of Classification Search
    CPC ........... H04W 4/90; H04W 68/00; G08B 7/06
    USPC ..................................................... 455/404.1
    See application file for complete search history.

(56) References Cited

U.S. PATENT DOCUMENTS

| | | | | |
|---|---|---|---|---|
| 11,176,760 | B2 * | 11/2021 | Mondello | H04L 12/40 |
| 11,995,978 | B1 * | 5/2024 | Lan | G08B 3/10 |
| 2010/0003959 | A1 * | 1/2010 | Coppage | H04W 52/0261 |
| | | | | 455/404.2 |
| 2017/0155965 | A1 * | 6/2017 | Ward | H04N 21/44008 |
| 2017/0171731 | A1 * | 6/2017 | Sennett | H04W 48/18 |
| 2020/0127749 | A1 * | 4/2020 | Rao | H04H 20/59 |
| 2021/0067972 | A1 * | 3/2021 | McGrath | H04W 4/90 |
| 2022/0068130 | A1 * | 3/2022 | Brooks | G08G 1/096844 |
| 2022/0070647 | A1 * | 3/2022 | Vagelos | H04W 4/06 |
| 2022/0377520 | A1 * | 11/2022 | Kumar | H04W 4/12 |

* cited by examiner

*Primary Examiner* — Maria El-Zoobi
(74) *Attorney, Agent, or Firm* — Hartman & Citrin LLC

(57) ABSTRACT

Concepts and technologies disclosed herein are directed to event-based wireless emergency alerts ("WEAs"). According to one aspect disclosed herein, a WEA-capable device can receive an event-based wireless emergency alert that includes an event code and alert content. The WEA-capable device can parse the event code from the event-based WEA. The WEA-capable device can determine, via execution of an event-based WEA function, a WEA format based upon the event code. The WEA-capable device can then output the alert content in the WEA format. In some embodiments, the event code identifies a weather-related emergency event (e.g., a hurricane or tornado warning). In other embodiments, the event code identifies a non-weather-related emergency event (e.g., a child abduction alert). The WEA format can be an event-specific spoken language, an event-specific symbol, an event-specific haptic feedback, or a combination thereof.

19 Claims, 10 Drawing Sheets

200

START

202
CAP ORIGINATION SYSTEM RECEIVES INPUT FROM EMERGENCY ALERT ORIGINATOR, INCLUDING ALERT CONTENT AND EVENT CODE

204
CAP ORIGINATION SYSTEM GENERATES CAP MESSAGE(S), INCLUDING ALERT CONTENT AND EVENT CODE

206
CAP ORIGINATION SYSTEM PROVIDES CAP MESSAGE(S) TO ALERT AGGREGATOR/GATEWAY SYSTEM

208
END

600 —

EVENT-BASED WIRELESS EMERGENCY ALERTS

BACKGROUND

In the United States, the Wireless Emergency Alert ("WEA") system delivers critical warnings and public safety information to the public on mobile devices. Participation by Commercial Mobile Service Providers ("CMSPs") is voluntary, but most CMSPs support WEAs. Participating CMSPs adhere to technical and operational requirements established by the Federal Communications Commission ("FCC").

Authorized alert originators, such as federal, state, or local emergency management agencies, send WEAs through the Integrated Public Alert and Warning System ("IPAWS") to participating CMSPs, which then broadcast the WEAs from cellular towers to mobile devices in affected areas. WEAs are sent using Short Message Service Cell Broadcast ("SMS-CB"), which is a one-to-many service that simultaneously delivers messages to multiple recipients in a specified area. By using SMS-CB, WEAs avoid the congestion issues experienced by traditional voice and text messaging (e.g., SMS Point-to-Point) alerting services, which translates into faster and more comprehensive delivery of messages during times of emergency.

Today, there is a single alerting tone and a single vibration cadence associated with all Wireless Emergency Alert ("WEA") notifications. There have been industry discussions about creating a few extra tones and cadences for alert notifications for which response time of the user is paramount (e.g., an earthquake or other natural disaster alert). In such cases, the theory is that users, for example, can hear a tone specific to an earthquake, will recognize the tone as an earthquake alert without even touching or viewing their wireless device, and can therefore respond appropriately (e.g., exiting a building or crawling under cover) based solely on hearing the earthquake-specific alerting tone. A problem with this solution is that public education for one or more new tones/cadences (i.e., beyond the existing WEA tone/cadence) will be extremely difficult.

Industry standards bodies have begun discussions about adding new event-specific tones for time-critical alerts, but these discussions have ignored the impractical nature of educating the public about any new tones/cadences. Also, there have been discussions about adding symbols to WEA messages to represent the event, but these discussions have centered around adding a symbol to the page on which the written alert appears.

SUMMARY

Concepts and technologies disclosed herein are directed to event-based WEAs. According to one aspect disclosed herein, a WEA-capable device can receive an event-based WEA that includes an event code and alert content. The WEA-capable device can parse the event code from the event-based WEA. The WEA-capable device can determine, via execution of an event-based WEA function, a WEA format based upon the event code. The WEA-capable device can then output the alert content in the WEA format.

In some embodiments, the event code identifies a weather-related emergency event (e.g., a hurricane or tornado warning) issued by the National Weather Service. In other embodiments, the event code identifies a non-weather-related emergency event (e.g., a child abduction alert). The alert content can include information that provides details about the event associated with the event code. For example, the alert content for a Child Abduction Emergency ("CAE") event code can describe the missing child, provide a description of the suspect or vehicle, and ask the public to notify the requesting agency if they have any information on the whereabouts of the child or supposed abductor. Several non-limiting example event codes will be described herein.

In some embodiments, the WEA format is an event-specific spoken language. The event-specific spoken language can include a voice announcing the event-based WEA, such as "earthquake alert," "tornado alert," or "thunderstorm warning." In some embodiments, the event-based WEA function can access a built-in digital assistant, such as SIRI available from Apple Inc., to announce the event-based WEA in the event-specific spoken language. The event-specific spoken language can use different voices for different alert types (e.g., male or female voice; specific accent). The event-specific spoken language can include a default language (e.g., English as required by the FCC for WEAs) and one or more additional languages (e.g., chosen by a user). In these embodiments, the WEA-capable device can output the alert content in the event-specific spoken language via a speaker (e.g., an internal speaker, or an external speaker via wired or wireless connection).

In some embodiments, the WEA format is an event-specific symbol. The event-specific symbol can include a symbol indicative of the event type identified in the event code. For example, a tornado symbol can be presented on a display of the WEA-capable device. In some embodiments, the symbol is emphasized by different color, flashing, and/or other visual effect(s). The display can be a primary display or secondary display built into the WEA-capable device. In some embodiments, the display is an external display such as a monitor. The display may be part of another device that is in communication with the WEA-capable device. For example, the display may be part of a smartwatch that is configured to present WEAs received by the WEA-capable device.

In some embodiments, the WEA format is an event-specific haptic feedback. The event-specific haptic feedback can be output by a haptic component that is capable of conveying information associated with the WEA to a user through the user's sense of touch. The haptic component can provide force feedback, vibrotactile feedback, electrotactile feedback, thermal feedback, a combination thereof, and/or the like. The event-specific haptic feedback can include a vibration cadence defined by the user.

In some embodiments, the WEA-capable device can determine the WEA format based upon a comparison of the event code to a list of event codes and desired WEA formats. The list of event codes and desired WEA formats can be defined, at least in part, by a user of the WEA-capable device.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter.

Furthermore, the claimed subject matter is not limited to implementations that solve any or all disadvantages noted in any part of this disclosure.

DETAILED DESCRIPTION

Figure 1:
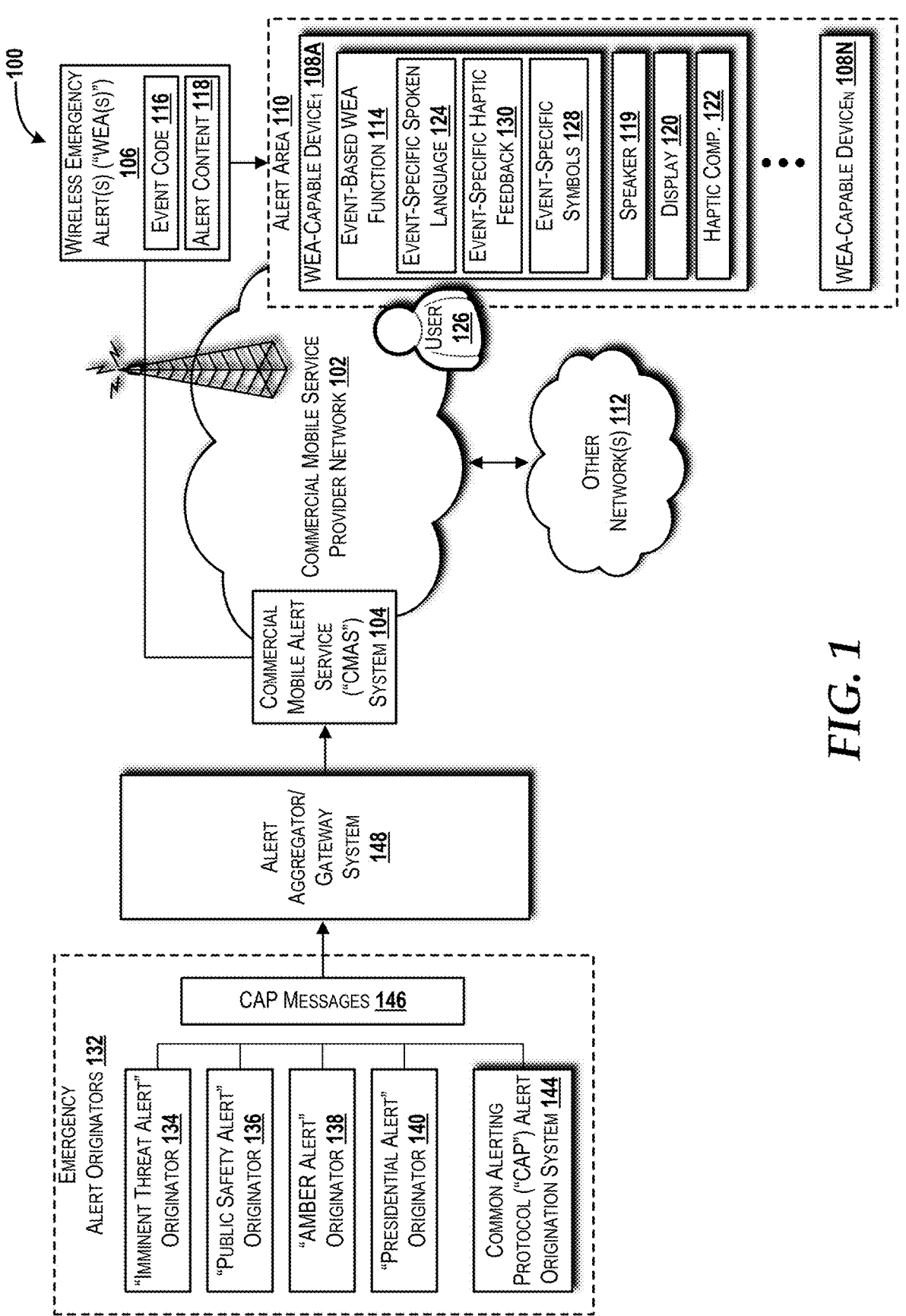
FIG. 1 is a block diagram illustrating aspects of an illustrative operating environment in which the concepts and technologies disclosed herein can be implemented.

The concepts and technologies disclosed herein modernize the experience of being alerted via WEA on a wireless device during emergencies by allowing for event-specific alert notifications with unique sounds (including spoken words), vibration cadences, and/or symbols provided on a screen. Today, event-specific codes (called "event codes") for emergency alerts are not included in WEA messages broadcast by Commercial Mobile Service Providers ("CMSPs").

Event codes are indeed transmitted from alert originators to the Federal Alert Gateway (part of FEMA IPAWS), but such event codes are not transmitted from FEMA IPAWS to the CMSPs. If an event code can be added to the signaling between FEMA IPAWS and the CMSPs for each WEA, the CMSPs could take advantage of the event codes by broadcasting them along with the WEA toward wireless devices in the alert area. When a wireless device receives an event code along with a WEA alert, event-specific spoken language (e.g., a voice saying "earthquake alert." "tornado alert," or "thunderstorm warning") and/or user-customizable event-specific cadences (especially useful for individuals who are deaf or otherwise hearing impaired) could be provided to the user. The event-specific spoken language can be in English (because the FCC requires English language WEA) and in the language of choice for received WEAs on the wireless devices (e.g., if a user has chosen to receive Spanish language alerts, then Spanish-spoken text signifying the event code will be provided to the user upon presentation of the alert).

To maximize effectiveness of event-based alerting, a symbol associated with the event (e.g., giant tornado symbol across an entire lighted flashing screen may be provided on the wireless device while the normal WEA alert tone and vibration cadence occur) may be provided to garner attention to an incoming alert. This latter case is especially useful for the deaf and hearing-impaired individuals. It should be noted that when a WEA alert is received today, the user must interact with the device (i.e., click an icon for display of the alert text). In accordance with the concepts and technologies disclosed herein, an appropriate event-based symbol can be displayed on the entire flashing screen to garner attention of the user.

Even a quick glance of a wireless device sitting on a table or on the dash of a car will allow the user to know what the alert is about before they have time to reach for the device to interact with it. This not only provides users with more rapid information about the nature of the emergency event, but also provides a safety enhancement because the user does not need to interact with the wireless device unless they want to see the specifics of the alert text (and in some scenarios, like driving a car, it is not safe to reach for and interact with the device). It also should be noted that the event-spoken language alert notification is particularly helpful to the blind community. Wireless devices would be built with support for spoken event language for all possible event codes in all possible language choices provided by the device. Different vibration cadences would be extremely difficult for users to understand unless those users were interested enough (e.g., blind and/or deaf) in taking the time to setup their WEA application on their device ahead of time (e.g., when they buy a new phone) to allow a person to recognize at least a handful of the most popular or most time-critical event codes in a user-customizable manner. This idea of customizable event-specific alert notifications using speech, tones, and vibration cadences could create great interest and opportunity among the disability community and their vendor advocates.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, mobile devices, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, aspects of concepts and technologies for event-based WEAs will be described.

Referring now to FIG. 1, an illustrative operating environment 100 in which the concepts and technologies disclosed herein can be implemented will be described. The operating environment 100 includes a CMSP network 102 that supports a commercial mobile alert service ("CMAS") via a CMAS system 104. In particular, the CMSP network 102 can provide one or more event-based WEAs 106 (hereafter referred to individually as "WEA 106" or collectively as "WEAs 106") to a plurality of WEA-capable devices 108A-108N (hereafter referred to individually as "WEA-capable device 108" or collectively as "WEA-capable devices 108") operating within an alert area 110. The alert area 110 can be or can include a geographical location that is affected by an emergency event, such as a real-world disaster and/or a crisis. For example, the emergency event can be or can include a hurricane, a tsunami, an earthquake, a tornado, a blizzard, a wildfire, a landslide, another natural disaster, a disease epidemic, an active shooter situation, a terrorist attack, and the like. The alert area 110 also can include a geographical location that is proximate to the emergency event (e.g., a nearby city).

The CMSP network 102 can include one or more radio access networks ("RANs;" not shown), each of which can include one or more cell sites having the same or different cell sizes, which may be represented by different cell-types. As used herein, a "cell" or "cell site" refers to a geographical area that is served by one or more base stations operating within an access network. In the illustrated example, the alert area 110 can include one or more cells, each of which can include a base station, such as an Evolved Node Base eNodeB ("eNB"), a mm Wave Next Generation Node Base ("gNB"), or a combination eNB/gNB. The RAN(s) and associated base station(s) can be configured in accordance with one or more 3GPP technical specifications for next generation ("5G") RAN architecture, combined 4G/5G RAN architecture, legacy technologies, revisions thereof, combinations thereof, and/or the like.

The CMSP network 102 can operate in accordance with one or more mobile telecommunications standards including, but not limited to, Global System for Mobile communications ("GSM"), Code Division Multiple Access ("CDMA") ONE, CDMA2000, Universal Mobile Telecommunications System ("UMTS"), LTE, Worldwide Interoperability for Microwave Access ("WiMAX"), other current 3GPP cellular technologies, other future 3GPP cellular technologies, combinations thereof, and/or the like. The CMSP network 102 can utilize various channel access methods (which may or may not be used by the aforementioned standards), including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Single-Carrier FDMA ("SC-FDMA"), Space Division Multiple Access ("SDMA"), and the like to provide a radio/air interface to the plurality of WEA-capable devices 108A-108N. Data communications can be provided in part by the CMSP network 102 using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and/or various other current and future wireless data access technologies. Moreover, the RAN may be a GSM RAN ("GRAN"), a GSM EDGE RAN ("GERAN"), a UMTS Terrestrial Radio Access Network ("UTRAN"), an evolved U-TRAN ("E-UTRAN"), Next Generation RAN ("NG-RAN"), any combination thereof, and/or the like. In some embodiments, the RAN is or includes one or more virtual RANs ("vRANs").

The CMSP network 102 also can include one or more core networks, such as an Evolved Packet Core ("EPC") network and a 5G Core Network. The CMSP network 102 is, in turn, in communication with one or more other networks 112 such as one or more other public land mobile networks ("PLMNs"), one or more Public Switched Telephone Networks ("PSTNs") one or more packet data networks ("PDNs") (e.g., the Internet), one or more emergency networks, other packet switched networks, other circuit switched networks, combinations thereof, and/or the like.

The alert area 110 can encompass one or more cells. The cells within the alert area 110 can include the same or different cell sizes, which may be represented by different cell-types. A cell-type can be associated with certain dimensional characteristics that define the effective radio range of a cell. Cell-types can include, but are not limited to, a macro cell-type, a metro cell-type, a femto cell-type, a pico cell-type, a micro cell-type, wireless local area network ("WLAN") cell-type, and a white space network cell-type. A "small cell" cell-type is utilized herein to collectively refer to a group of cell-types that includes femto cell-type, pico cell-type, and micro cell-type, in general contrast to a macro cell-type, which offers a larger coverage area. Other cell-types, including proprietary cell-types and temporary cell-types are also contemplated.

The CMSP network 102 can be implemented, at least in part, as physical network functions ("PNFs") having hardware and software components. The CMSP network 102 can additionally or alternatively be implemented, at least in part, by virtual network functions ("VNFs"). For example, the core network components can be realized as VNFs that utilize a unified commercial-off-the-shelf ("COTS") hardware and flexible resources shared model with the application software for the respective core network components running on one or more virtual machines ("VMs"). Moreover, the core network components can be embodied as VNFs in one or more VNF pools, each of which can include a plurality of VNFs providing a particular core network function. An example virtualized cloud architecture 900 upon which the CMSP network 102 can be deployed is illustrated and described herein with reference to FIG. 9.

Figure 6:
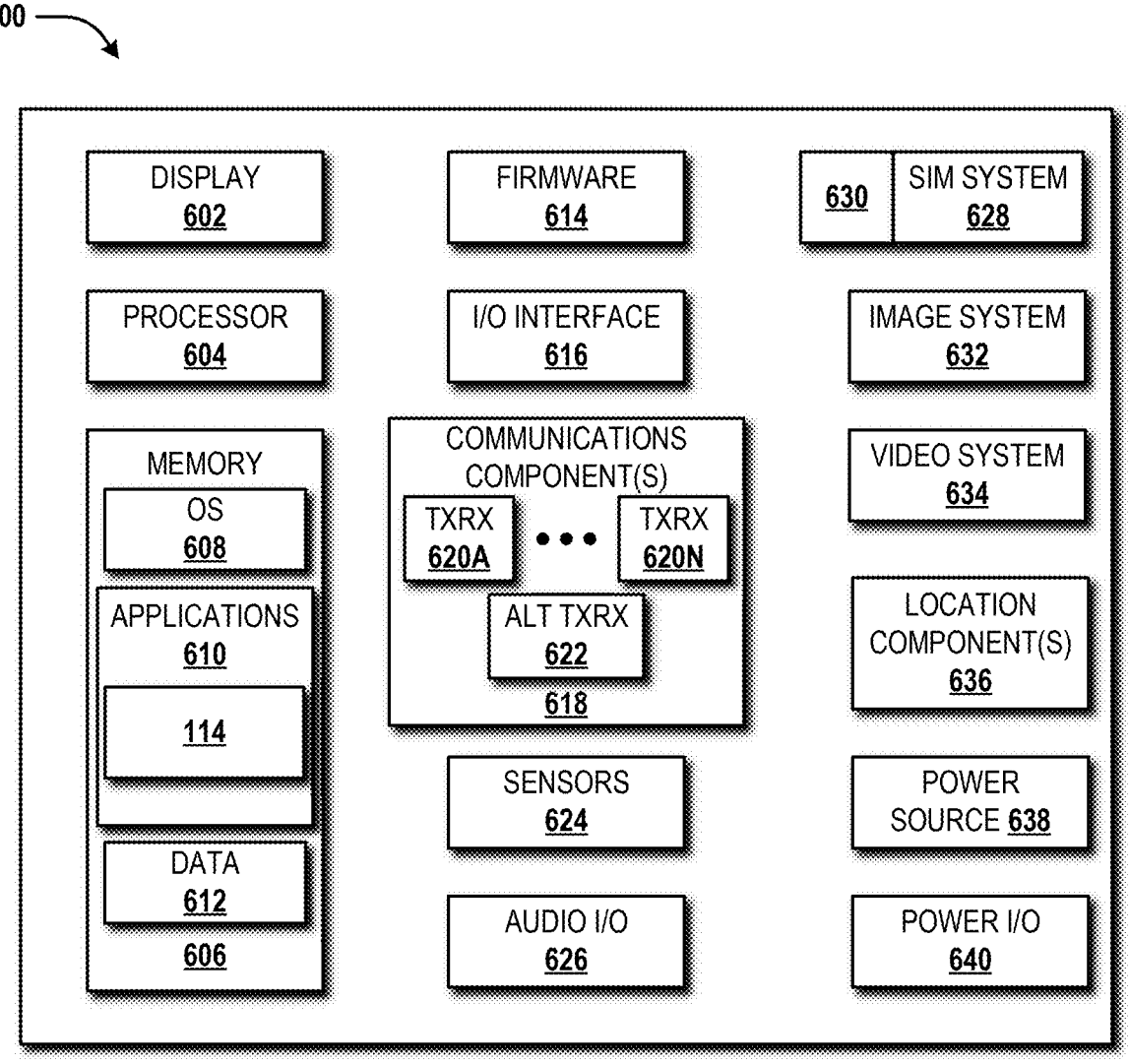
FIG. 6 is a block diagram illustrating an example mobile device, according to an illustrative embodiment.

The WEA-capable device 108 can be a cellular phone, a feature phone, a smartphone, a mobile computing device, a tablet computing device, a portable video game console, or any other computing device that includes one or more radio access components that are capable of connecting to and communicating with one or more RANs via one or more radio access components. Moreover, the WEA-capable device 108 can include an event-based WEA function 114. In some embodiments, the event-based WEA function 114 is implemented as part of an operating system of the WEA-capable device 108. An example operating system 608 is best shown in FIG. 6. In other embodiments, the event-based WEA function 114 is a standalone application that provides event-based WEA functionality alone or in combination with other functionality (e.g., standard WEAs).

The event-based WEA function 114 can receive the WEA 106 from the CMAS system 104. The WEA 106 can include an event code 116 and alert content 118. The event code 116 can specify the nature of an event, which can be a weather-related event code issued by the National Weather Service or a non-weather emergency message ("NWEM") event code. The alert content 118 includes information that provides details about the event associated with the event code 116.

For example, the alert content 118 for a Child Abduction Emergency ("CAE") event code can describe the missing child, provide a description of the suspect or vehicle, and ask the public to notify the requesting agency if they have any information on the whereabouts of the child or supposed abductor. Several example event codes 116 will now be described. These examples are current as of the filing date of this application. The concepts and technologies disclosed herein are applicable to new event codes 116.

The event code 116 can be an administrative message ("ADR"), which is a non-emergency message that provides updated information about an event in progress, an event that has expired or concluded early, pre-event preparation or mitigation activities, post-event recovery operations, or other administrative matters pertaining to the CMAS.

The event code 116 can be an Avalanche Watch ("AVA"), which is an emergency message indicating that conditions are favorable or expected for an avalanche but not imminent or occurring. The purpose of an avalanche watch is to warn the public that avalanche warning criteria are likely to be met in 24-48 hours. The event code 116 can be an Avalanche Warning ("AVW"), which is an emergency message indicating conditions are imminent or occurring.

The event code 116 can be a Blue Alert ("BLU"), which is a message issued by state and local authorities to warn the public when there is actionable information, related to a law enforcement officer who is missing, seriously injured or killed in the line of duty, or when there is an imminent, credible threat to an officer. A Blue Alert could quickly warn the public if a violent suspect may be in a community, along with providing instructions on what to do if the suspect is spotted and how to stay safe.

The event code 116 can be a Civil Danger Warning ("CDW"), which is an emergency warning message of an event that presents a danger to a significant civilian population. The CDW, which usually warns of a specific hazard and gives specific protective action, has a higher priority than the Local Area Emergency ("LAE"). Examples include contaminated water supply and imminent or in-progress military or terrorist attack. Public protective actions could include evacuation, shelter in place or other actions (such as boiling contaminated water or seeking medical treatment).

The event code 116 can be a Civil Emergency Message ("CEM"), which is an emergency message regarding an in-progress or imminent significant threat(s) to public safety and/or property. The CEM is a higher priority message than the LAE, but the hazard is less specific than the CDW. For example, the CEM could be used to describe a change in the Homeland Security Alert System level in response to a terrorist threat.

The event code 116 can be a Practice/Demo Warning ("DMO"), which is a demonstration or test message used for particular purposes as established in state, local, tribal, or territorial EAS plans. Purposes may include testing of a siren system or audio quality checks.

The event code 116 can be an Earthquake Warning ("EQW"), which is a warning of current or imminent earthquake activity. Authorized officials may recommend or order protective actions according to state law or local ordinance.

The event code 116 can be an Immediate Evacuation ("EVI"), which is a warning where immediate evacuation is recommended or ordered according to state law or local, tribal, or territorial ordinance. As an example, authorized officials may recommend the evacuation of affected areas due to an approaching tropical cyclone. In the event a flammable or explosive gas is released, authorized officials may recommend evacuation of designated areas where casualties or property damage from a vapor cloud explosion or fire may occur.

The event code 116 can be a Fire Warning ("FRW"), which is a warning of a spreading wildfire or structure fire that threatens a populated area. Evacuation of areas in the fire's path may be recommended by authorized officials according to state law or local ordinance.

The event code 116 can be a Hazardous Materials Warning ("HMW"), which is a warning of a release of non-radioactive hazardous material (e.g., a flammable gas, toxic chemical, or biological agent) that may recommend evacuation (e.g., for an explosion, fire, or oil spill hazard) or shelter in place (e.g., for a toxic fume hazard).

The event code 116 can be a LAE, which is an emergency message that defines an event that by itself does not pose a significant threat to public safety and/or property. However, the event could escalate, contribute to other more serious events, or disrupt critical public safety services. Instructions, other than public protective actions, may be provided by authorized officials. Examples include: a disruption in water, electric or natural gas service, road closures due to excessive snowfall, or a potential terrorist threat where the public is asked to remain alert.

The event code 116 can be a Law Enforcement Warning ("LEW"), which is a warning of a bomb explosion, riot or other criminal event (e.g., a jailbreak). An authorized law enforcement agency may blockade roads, waterways or facilities, evacuate or deny access to affected areas, and arrest violators or suspicious persons.

The event code 116 can be a Nuclear Power Plant Warning ("NUW"), which is a warning of an event at a nuclear power plant, classified as a Site Area Emergency or General Emergency as classified by the Nuclear Regulatory Commission ("NRC"). A Site Area Emergency is confined to the plant site; no offsite impact is expected. Typically, a General Emergency is confined to an area less than a 10-mile radius around the plant. Authorized officials may recommend evacuation or medical treatment of exposed persons in nearby areas.

The event code 116 can be a Radiological Hazard Warning ("RHW"), which is a warning of the loss, discovery or release of a radiological material. Examples include: the theft of a radioactive isotope used for medical, seismic, or other purposes; the discovery of radioactive materials; a transportation (e.g., aircraft, truck or rail, etc.) accident that may involve nuclear weapons, nuclear fuel, or radioactive wastes. Authorized officials may recommend protective actions to be taken if a radioactive hazard is discovered.

The event code 116 can be a Required Monthly Test ("RMT"), which is a test message that is typically pre-scheduled and coordinated state-or region-wide on an annual basis. RMTs are generally originated by a pre-designated local or state primary station, or a state emergency management agency. RMTs must be relayed by broadcast stations and cable channels. RMTs must be performed between 8:30 a.m. and local sunset during odd numbered months, and between local sunset and 8:30 a.m. during even numbered months. Received monthly tests must be retransmitted within 60 minutes of receipt. Additionally, an RMT should not be scheduled or conducted during an event of great importance such as a pre-announced Presidential speech, coverage of a national/local election, major local or national news coverage outside regularly scheduled newscast hours or a major national sporting event such as the Super Bowl or World Series, with other events such as the Indianapolis 500 and Olympic Games mentioned in individual EAS state plans.

The event code 116 can be a Required Weekly Test ("RWT"), which is a test message that consists, at a minimum, of the header and end-of-message tones. Though an RWT does not need an audio or graphic message announcing the test, many stations provide them as a courtesy to the public. In addition, television stations are not required to transmit a video message for weekly tests. RWTs are scheduled by the station on random days and times during weeks when there is no Required Monthly Test scheduled. Broadcast and cable operators generally do not relay incoming RWTs. EAS RWTs may be originated by state and local alerting authorities to confirm the operational status of their IPAWS Live alerting software configuration without fear of interrupting broadcast or cable programming.

The event code 116 can be a Shelter in Place Warning ("SPW"), which is a warning of an event where the public is recommended to shelter in place (e.g., go inside, close doors and windows, turn off air conditioning or heating systems, and turn on the radio or TV for more information). An example is the release of hazardous materials where toxic fumes or radioactivity may affect designated areas.

The event code 116 can be a 911 Telephone Outage Emergency ("TOE"), which is an emergency message that defines a local or state 911 telephone network outage by geographic area or telephone exchange. Authorized officials may provide alternate phone numbers with which to reach 911 or dispatch personnel.

The event code 116 can be a Volcano Warning ("VOW"), which is a warning of current or imminent volcanic activity. Authorized officials may recommend or order protective actions according to state law or local ordinance.

The illustrated WEA-capable device 108 also includes a speaker 119, a display 120, and a haptic component 122. The speaker 119 can be used to present event-specific spoken language 124 to a user 126. The speaker 119 can be a built-in speaker or an external speaker (e.g., headphones) connected to the WEA-capable device 108 via a wireless (e.g., BLUETOOTH) or wired (e.g., headphone jack) connection. The event-specific spoken language 124 can include a voice announcing the WEA 106, such as "earthquake alert," "tornado alert," or "thunderstorm warning." In some embodiments, the event-based WEA function 114 can access a built-in digital assistant, such as SIRI available from Apple Inc., to announce the WEA 106. The event-specific spoken language 124 can use different voices for different alert types (e.g., male or female voice; specific accent). The event-specific spoken language 124 can include a default language (e.g., English as required by the FCC for WEAs) and one or more additional languages (e.g., chosen by the user 126). If the user 126 has chosen to receive Spanish language alerts, for example, then Spanish-spoken text signifying the event code 116 will be provided to the user 126 upon presentation of the WEA 106.

The display 120 can be a primary display or secondary display built-into the WEA-capable device 108 and can be used to present event-specific symbols 128 to the user 126. In some embodiments, the display 120 is an external display such as a monitor. The display 120 may be part of another device that is in communication with the WEA-capable device 108. For example, the display 120 may be part of a smartwatch that is configured to present WEAs 106 received by the WEA-capable device 108. The event-specific symbols 128 can include symbols indicative of the event type identified in the event code 116. For example, a tornado symbol can be presented on the display 120. In some embodiments, the symbol is emphasized by different color, flashing, and/or other visual effect(s).

The haptic component 122 can be any component that is capable of conveying information (e.g., associated with the WEA 106), such as event-specific haptic feedback 130, to the user 126 through the user's 126 sense of touch. The haptic component 122 can provide force feedback, vibrotactile feedback, electrotactile feedback, thermal feedback, a combination thereof, and/or the like. The event-specific haptic feedback 130 can include a vibration cadence defined by the user 126.

In some embodiments, the event-based WEA function 114 can provide a user interface through which the user 126 can define the event-specific spoken language 124, the event-specific symbols 128, and the event-specific haptic feedback 130. The user interface may facilitate complete user-customizability of the event-specific spoken language 124, the event-specific symbols 128, and the event-specific haptic feedback 130. The user interface may provide suggestions through a guided customization experience.

The WEAs 106 can originate from one or more emergency alert originators 132. In general, the emergency alert originators 132 can be one or more "imminent threat alert" originators 134, one or more "public safety alert" originators 136, one or more "AMBER alert" originators 138, one or more "presidential alert" originators 140, or some combination thereof. Each of the emergency alert originators 132 can utilize a common alerting protocol ("CAP") alert origination system 144 to create one or more CAP messages 146 to be sent to an alert aggregator/gateway system 148. CAP is a standardized digital format for exchanging emergency alerts. CAP allows a consistent alert message to be disseminated simultaneously over multiple communications pathways. The alert aggregator/gateway system 148 can receive the CAP messages 146 from the emergency alert originators 132 and route the CAP messages 146 to various alerting disseminators. In the illustrated example, the alert aggregator/gateway system 148 routes the CAP messages 146 to the CMAS system 104. In real-world implementations, however, the alert aggregator/gateway system 148 can route the CAP messages 146 to other alerting disseminators, such as EAS for radio and television, Internet services for web browsers, widgets, web sites, social media, NOAA, state/local unique alerting systems, digital signage, and other future alerting technologies.

Figure 2:
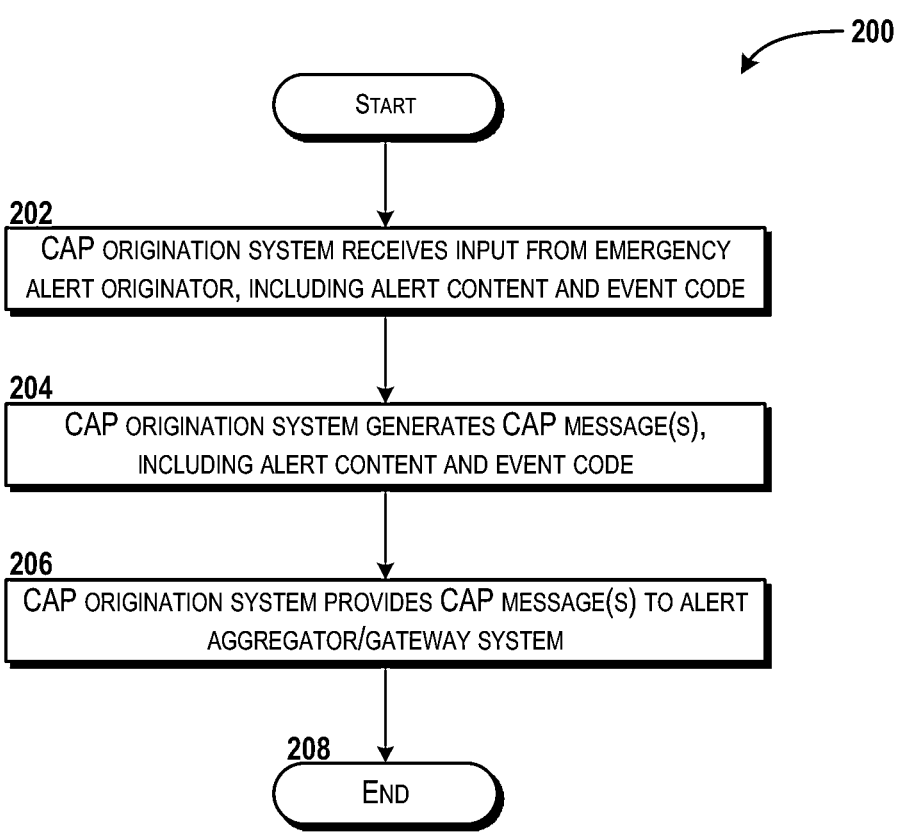
FIG. 2 is a flow diagram illustrating a method, performed by a common alerting protocol ("CAP") origination system, for providing event-based wireless emergency alerts ("WEAs") to WEA-capable devices, according to an illustrated embodiment.

Turning now to FIG. 2, a flow diagram illustrating a method 200, performed by the CAP alert origination system 144, for providing the event-based WEAs 106 to the WEA-capable devices 108 will be described, according to an illustrated embodiment. The method 200 will be described with reference to FIG. 2 and additional reference to FIG. 1. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing one or more processors disclosed herein to perform operations.

The method 200 begins and proceeds to operation 202. At operation 202, the CAP alert origination system 144 receives input from an emergency alert originator 132. The CAP alert origination system 144 may be a centralized system accessible by multiple emergency alert originators 132. Alternatively, each of the emergency alert originators 132 may have a dedicated CAP alert origination system 144. The input can define the event code 116 and the alert content 118 to be provided in a WEA 106.

From operation 202, the method 200 proceeds to operation 204. At operation 204, the CAP alert origination system 144 generates a CAP message 146, including the event code 116 and the alert content 118 input at operation 202. From operation 204, the method 200 proceeds to operation 206. At operation 206, the CAP alert origination system 144 provides the CAP message 146 to the alert aggregator/gateway system 148.

From operation 206, the method 200 proceeds to operation 208. At operation 208, the method 200 can end.

Figure 3:
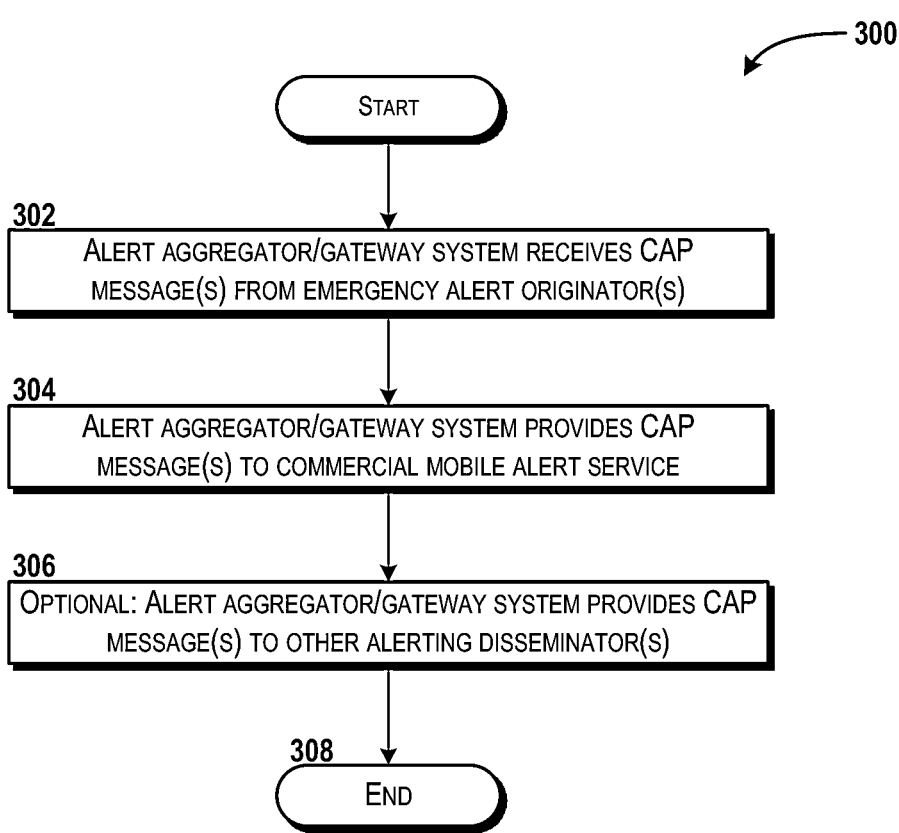
FIG. 3 is a flow diagram illustrating a method, performed by an alert aggregator/gateway system, for providing event-based WEAs to WEA-capable devices, according to an illustrated embodiment.

Turning now to FIG. 3, a flow diagram illustrating a method 300, performed by the alert aggregator/gateway system 148, for providing event-based WEAs 106 to the WEA-capable devices 108 will be described, according to an illustrated embodiment. The method 300 begins and proceeds to operation 302. At operation 302, the alert aggregator/gateway system 148 receives the CAP message 146 from the emergency 132. As noted above, the alert aggregator/gateway system 148 may receive multiple CAP messages 146 from multiple emergency alert originators 132. A single CAP message 146 from a single emergency alert originator 132 will be described for ease of explanation and not limitation.

From operation 302, the method 300 proceeds to operation 304. At operation 304, the alert aggregator/gateway system 148 provides the CAP message 146 to the CMAS system 104. From operation 304, the method 300 proceeds to operation 306. In the illustrated example, operation 306 is optional. At operation 306, the alert aggregator/gateway system 148 provides the CAP message 146 to one or more other alerting disseminator(s).

From operation 306, the method 300 proceeds to operation 308. At operation 308, the method 300 can end.

Figure 4:
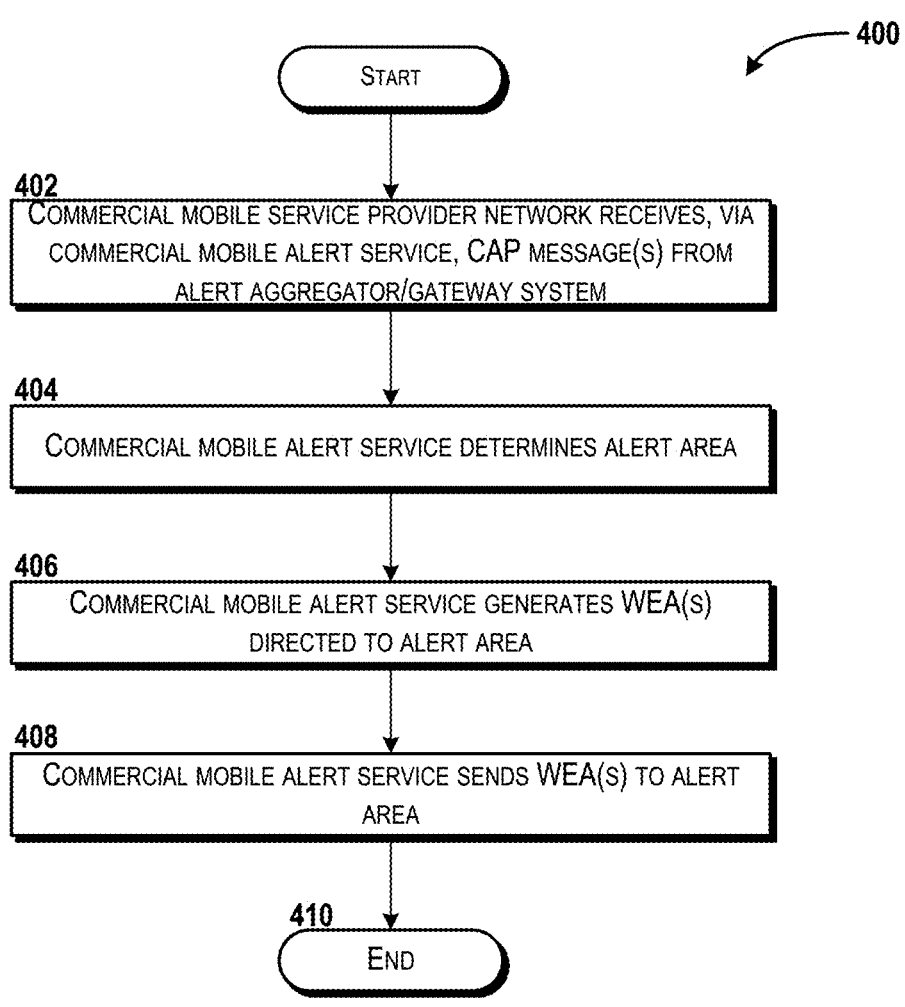
FIG. 4 is a flow diagram illustrating a method, performed by a commercial mobile alert service ("CMAS"), for providing event-based WEAs to WEA-capable devices, according to an illustrated embodiment.

Turning now to FIG. 4, a flow diagram illustrating a method 400, performed by the CMAS system 104, for providing event-based WEAs 106 to the WEA-capable devices 108 will be described, according to an illustrated embodiment. The method 400 begins and proceeds to operation 402. At operation 402, the CMAS system 104 receives the CAP message 146 from the alert aggregator/gateway system 148. From operation 402, the method 400 proceeds to operation 404. At operation 404, the CMAS system 104 determines the alert area 110. From operation 404, the method 400 proceeds to operation 406. At operation 406, the CMAS system 104 generates the WEA 106 directed to the alert area 110. From operation 406, the method 400 proceeds to operation 408. At operation 408, the CMAS system 104 sends the WEA 106 to the alert area 110.

From operation 408, the method 400 proceeds to operation 410. The method 400 can end at operation 410.

Figure 5:
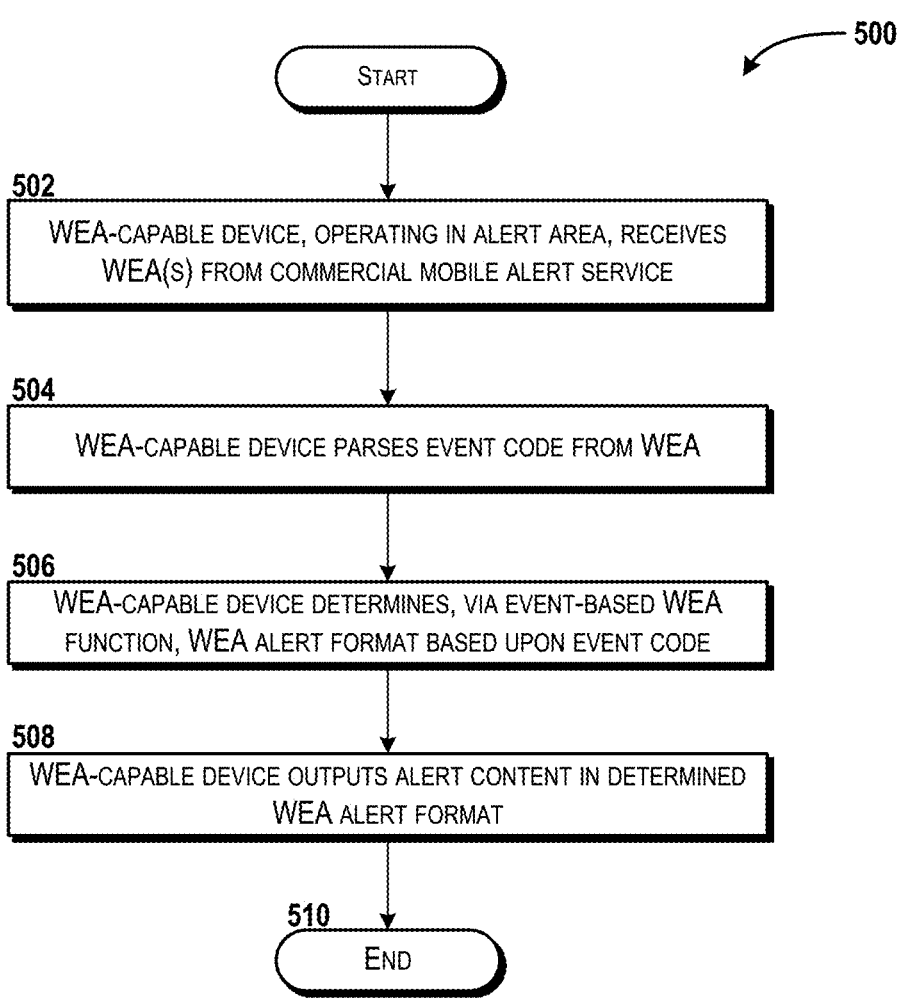
FIG. 5 is a flow diagram illustrating a method, performed by a WEA-capable device, for presenting an event-based WEA, according to an illustrated embodiment.

Turning now to FIG. 5, a flow diagram illustrating a method 500, performed by the WEA-capable device 108, for presenting an event-based WEA 106 will be described, according to an illustrated embodiment. The method 500 begins and proceeds to operation 502. At operation 502, the WEA-capable device 108, operating in the alert area 110, receives the WEA 106 from the CMAS system 104. From operation 502, the method 500 proceeds to operation 504. At operation 504, the WEA-capable device 108 parses the event code 116 from the WEA 106. From operation 504, the method 500 proceeds to operation 506. At operation 506, the WEA-capable device 108 determines, via the event-based WEA function 114, the WEA alert format to be used based upon the event code 116. The event-based WEA function 114 can maintain a list of event codes 116 and the desired WEA alert format for each event code 116. As discussed above, the WEA alert format may be event-specific spoken language 124, event-specific symbols 128, event-specific haptic feedback 130, or some combination thereof. These WEA alert formats can be used in addition to a default WEA format. For example, the WEA 106 may be presented in English text per FEMA requirement and spoken English based upon the desired WEA alert format for the event code 116. From operation 506, the method 500 proceeds to operation 508. At operation 508, the WEA-capable device 108 outputs the alert content 118 in the determined WEA alert format.

From operation 508, the method 500 proceeds to operation 510. The method 500 can end at operation 510.

Turning now to FIG. 6, an illustrative mobile device 600 and components thereof will be described. In some embodiments, the WEA-capable device 108 described above with reference to FIG. 1 can be configured as and/or can have an architecture similar or identical to the mobile device 600 described herein in FIG. 6. It should be understood, however, that the WEA-capable device 108 may or may not include the functionality described herein with reference to FIG. 6. While connections are not shown between the various components illustrated in FIG. 6, it should be understood that some, none, or all of the components illustrated in FIG. 6 can be configured to interact with one another to carry out various device functions. In some embodiments, the components are arranged so as to communicate via one or more busses (not shown). Thus, it should be understood that FIG. 6 and the following description are intended to provide a general understanding of a suitable environment in which various aspects of embodiments can be implemented, and should not be construed as being limiting in any way.

As illustrated in FIG. 6, the mobile device 600 can include a display 602 (e.g., the display 120) for displaying data such as the alert content 118 in text format, event-specific symbol 128 format, and/or some other visual format. According to various embodiments, the display 602 can be configured to display network connection information, various GUI elements, text, images, video, virtual keypads and/or keyboards, messaging data, notification messages, metadata, Internet content, device status, time, date, calendar data, device preferences, map and location data, combinations thereof, and/or the like. The mobile device 600 also can include a processor 604 and a memory or other data storage device ("memory") 606. The processor 604 can be configured to process data and/or can execute computer-executable instructions stored in the memory 606. The computer-executable instructions executed by the processor 604 can include, for example, an operating system 608, one or more applications 610, other computer-executable instructions stored in the memory 606, or the like. The operating system 608 can include the event-based WEA function 114. Alternatively, the applications 610 can include the event-based WEA function 114.

The UI application can interface with the operating system 608 to facilitate user interaction with functionality and/or data stored at the mobile device 600 and/or stored elsewhere. In some embodiments, the operating system 608 can include a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 604 to aid a user in data communications, entering/deleting data, entering and setting user IDs and passwords for device access, configuring settings, manipulating content and/or settings, multimode interaction, interacting with other applications 610, and otherwise facilitating user interaction with the operating system 608, the applications 610, and/or other types or instances of data 612 that can be stored at the mobile device 600.

The applications 610, the data 612, and/or portions thereof can be stored in the memory 606 and/or in a firmware 614, and can be executed by the processor 604. The firmware 614 also can store code for execution during device power up and power down operations. It can be appreciated that the firmware 614 can be stored in a volatile or non-volatile data storage device including, but not limited to, the memory 606 and/or a portion thereof.

The mobile device 600 also can include an input/output ("I/O") interface 616. The I/O interface 616 can be configured to support the input/output of data such as location information, presence status information, user IDs, passwords, and application initiation (start-up) requests. In some embodiments, the I/O interface 616 can include a hardware connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 600 can be configured to synchronize with another device to transfer content to and/or from the mobile device 600. In some embodiments, the mobile device 600 can be configured to receive updates to one or more of the applications 610 via the I/O interface 616, though this is not necessarily the case. In some embodiments, the I/O interface 616 accepts I/O devices such as the haptic component 122, keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 616 may be used for communications between the mobile device 600 and a network device or local device.

The mobile device 600 also can include a communications component 618. The communications component 618 can be configured to interface with the processor 604 to facilitate wired and/or wireless communications with one or more networks, such as the CMSP network 102 and/or the other network(s) 112. In some embodiments, the communications component 618 includes a multimode communications subsystem for facilitating communications via the cellular network and one or more other networks.

The communications component 618, in some embodiments, includes one or more transceivers. The one or more transceivers, if included, can be configured to communicate over the same and/or different wireless technology standards with respect to one another. For example, in some embodiments, one or more of the transceivers of the communications component 618 may be configured to communicate using GSM, CDMAONE, CDMA2000, UMTS, LTE, and various other 2G, 3G, 4G, 5G, 6G, and greater generation technology standards. Moreover, the communications component 618 may facilitate communications over various channel access methods (which may or may not be used by the aforementioned standards) including, but not limited to, TDMA, FDMA, W-CDMA, OFDM, SDMA, and the like.

In addition, the communications component 618 may facilitate data communications using GPRS, EDGE, the HSPA protocol family including HSDPA, EUL or otherwise termed HSUPA, HSPA+, and various other current and future wireless data access standards. In the illustrated embodiment, the communications component 618 can include a first transceiver ("TxRx") 620A that can operate in a first communications mode (e.g., GSM). The communications component 618 also can include an Nth transceiver ("TxRx") 620N that can operate in a second communications mode relative to the first transceiver 620A (e.g., UMTS). While two transceivers 620A-620N (hereinafter collectively and/or generically referred to as "transceivers 620") are shown in FIG. 6, it should be appreciated that less than two, two, and/or more than two transceivers 620 can be included in the communications component 618.

The communications component 618 also can include an alternative transceiver ("Alt TxRx") 622 for supporting other types and/or standards of communications. According to various contemplated embodiments, the alternative transceiver 622 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 618 also can facilitate reception from terrestrial radio networks, digital satellite radio networks, internet-based radio service networks, combinations thereof, and the like. The communications component 618 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 600 also can include one or more sensors 624. The sensors 624 can include temperature sensors, light sensors, air quality sensors, movement sensors, accelerometers, magnetometers, gyroscopes, infrared sensors, orientation sensors, noise sensors, microphones proximity sensors, combinations thereof, and/or the like. Additionally, audio capabilities for the mobile device 600 may be provided by an audio I/O component 626. The audio I/O component 626 of the mobile device 600 can include one or more speakers (e.g., the speaker 119) for the output of audio signals, one or more microphones for the collection and/or input of audio signals, and/or other audio input and/or output devices.

The illustrated mobile device 600 also can include a subscriber identity module ("SIM") system 628. The SIM system 628 can include a universal SIM ("USIM"), a universal integrated circuit card ("UICC"), e-SIM, and/or other identity devices. The SIM system 628 can include and/or can be connected to or inserted into an interface such as a slot interface 630. In some embodiments, the slot interface 630 can be configured to accept insertion of other identity cards or modules for accessing various types of networks. Additionally, or alternatively, the slot interface 630 can be configured to accept multiple subscriber identity cards. Because other devices and/or modules for identifying users and/or the mobile device 600 are contemplated, it should be understood that these embodiments are illustrative, and should not be construed as being limiting in any way.

The mobile device 600 also can include an image capture and processing system 632 ("image system"). The image system 632 can be configured to capture or otherwise obtain photos, videos, and/or other visual information. As such, the image system 632 can include cameras, lenses, charge-coupled devices ("CCDs"), combinations thereof, or the like. The mobile device 600 may also include a video system 634. The video system 634 can be configured to capture, process, record, modify, and/or store video content. Photos and videos obtained using the image system 632 and the video system 634, respectively, may be added as message content to an MMS message, email message, and sent to another device. The video and/or photo content also can be shared with other devices via various types of data transfers via wired and/or wireless communication devices as described herein.

The mobile device 600 also can include one or more location components 636. The location components 636 can be configured to send and/or receive signals to determine a geographic location of the mobile device 600. According to various embodiments, the location components 636 can send and/or receive signals from global positioning system ("GPS") devices, assisted-GPS ("A-GPS") devices, WI-FI/ WIMAX and/or cellular network triangulation data, combinations thereof, and the like. The location component 636 also can be configured to communicate with the communications component 618 to retrieve triangulation data for determining a location of the mobile device 600. In some embodiments, the location component 636 can interface with cellular network nodes, telephone lines, satellites, location transmitters and/or beacons, wireless network transmitters and receivers, combinations thereof, and the like. In some embodiments, the location component 636 can include and/or can communicate with one or more of the sensors 624 such as a compass, an accelerometer, and/or a gyroscope to determine the orientation of the mobile device 600. Using the location component 636, the mobile device 600 can generate and/or receive data to identify its geographic location, or to transmit data used by other devices to determine the location of the mobile device 600. The location component 636 may include multiple components for determining the location and/or orientation of the mobile device 600.

The illustrated mobile device 600 also can include a power source 638. The power source 638 can include one or more batteries, power supplies, power cells, and/or other power subsystems including alternating current ("AC") and/ or direct current ("DC") power devices. The power source 638 also can interface with an external power system or charging equipment via a power I/O component 640. Because the mobile device 600 can include additional and/or alternative components, the above embodiment should be understood as being illustrative of one possible operating environment for various embodiments of the concepts and technologies described herein. The described embodiment of the mobile device 600 is illustrative, and should not be construed as being limiting in any way.

As used herein, communication media includes computer-executable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

By way of example, and not limitation, computer storage media may include volatile and non-volatile, removable and non-removable media implemented in any method or technology for storage of information such as computer-executable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the mobile device 600 or other devices or computers described herein, such as the computer system 700 described above with reference to FIG. 7. In the claims, the phrases "computer storage medium," "computer-readable storage medium," and variations thereof do not include waves or signals per se and/or communication media, and therefore should be construed as being directed to "non-transitory" media only.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations may take place in the mobile device 600 in order to store and execute the software components presented herein. It is also contemplated that the mobile device 600 may not include all of the components shown in FIG. 6, may include other components that are not explicitly shown in FIG. 6, or may utilize an architecture completely different than that shown in FIG. 6.

Figure 7:
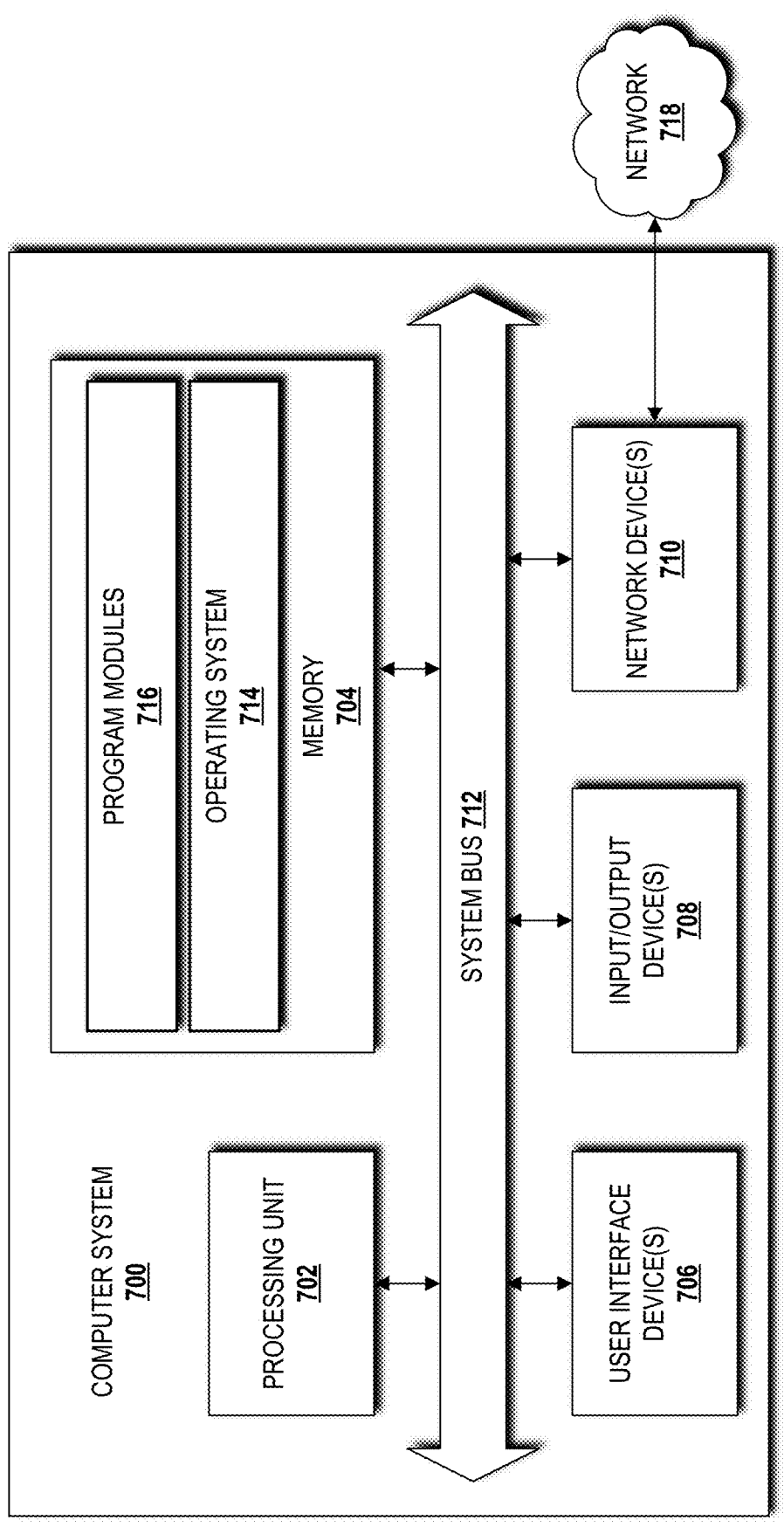
FIG. 7 is a block diagram illustrating an example computer system capable of implementing aspects of the embodiments presented herein.

Turning now to FIG. 7 is a block diagram illustrating a computer system 700 configured to provide the functionality in accordance with various embodiments of the concepts and technologies disclosed herein. The systems, devices, and other components disclosed herein, such as the alert aggregator/gateway system 148, the CAP alert origination system 144, and/or the CMAS system 104, can be implemented, at least in part, using an architecture that is the same as or similar to the architecture of the computer system 700. It should be understood, however, that modification to the architecture may be made to facilitate certain interactions among elements described herein.

The computer system 700 includes a processing unit 702, a memory 704, one or more user interface devices 706, one or more input/output ("I/O") devices 708, and one or more network devices 710, each of which is operatively connected to a system bus 712. The bus 712 enables bi-directional communication between the processing unit 702, the memory 704, the user interface devices 706, the I/O devices 708, and the network devices 710.

The processing unit 702 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 704 communicates with the processing unit 702 via the system bus 712. In some embodiments, the memory 704 is operatively connected to a memory controller (not shown) that enables communication with the processing unit 702 via the system bus 712. The illustrated memory 704 includes an operating system 714 and one or more program modules 716. The operating system 714 can include, but is not limited to, members of the WINDOWS, WINDOWS CE, and/or WINDOWS MOBILE families of operating systems from MICROSOFT CORPORATION, the LINUX family of operating systems, the MAC OS, OS X, and/or iOS families of operating systems from APPLE CORPORATION, other operating systems, and the like.

The program modules 716 may include various software and/or program modules to perform the various operations described herein. The program modules 716 and/or other programs can be embodied in computer-readable media containing instructions that, when executed by the processing unit 702, perform various operations such as those described herein. According to embodiments, the program modules 716 may be embodied in hardware, software, firmware, or any combination thereof.

By way of example, and not limitation, computer-readable media may include any available computer storage media or communication media that can be accessed by the computer system 700. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 700. In the claims, the phrases "computer storage medium," "computer-readable storage medium," and variations thereof do not include waves or signals per se and/or communication media, and therefore should be construed as being directed to "non-transitory" media only.

The user interface devices 706 may include one or more devices with which a user accesses the computer system 700. The user interface devices 706 may include, but are not limited to, computers, servers, PDAs, cellular phones, or any suitable computing devices. The I/O devices 708 enable a user to interface with the program modules 716. In one embodiment, the I/O devices 708 are operatively connected to an I/O controller (not shown) that enables communication with the processing unit 702 via the system bus 712. The I/O devices 708 may include one or more input devices, such as, but not limited to, a keyboard, a mouse, or an electronic stylus. Further, the I/O devices 708 may include one or more output devices, such as, but not limited to, a display screen or a printer. In some embodiments, the I/O devices 708 can be used for manual controls for operations to exercise under certain emergency situations.

The network devices 710 enable the computer system 700 to communicate with other networks or remote systems via a network 718, such as the CMSP network 102 and the other network(s) 112. Examples of the network devices 710 include, but are not limited to, a modem, a radio frequency ("RF") or infrared ("IR") transceiver, a telephonic interface, a bridge, a router, or a network card. The network 718 may be or may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 718 may be or may include a wired network such as, but not limited to, a Wide Area Network ("WAN"), a wired Personal Area Network ("PAN"), or a wired Metropolitan Area Network ("MAN").

Figure 8:
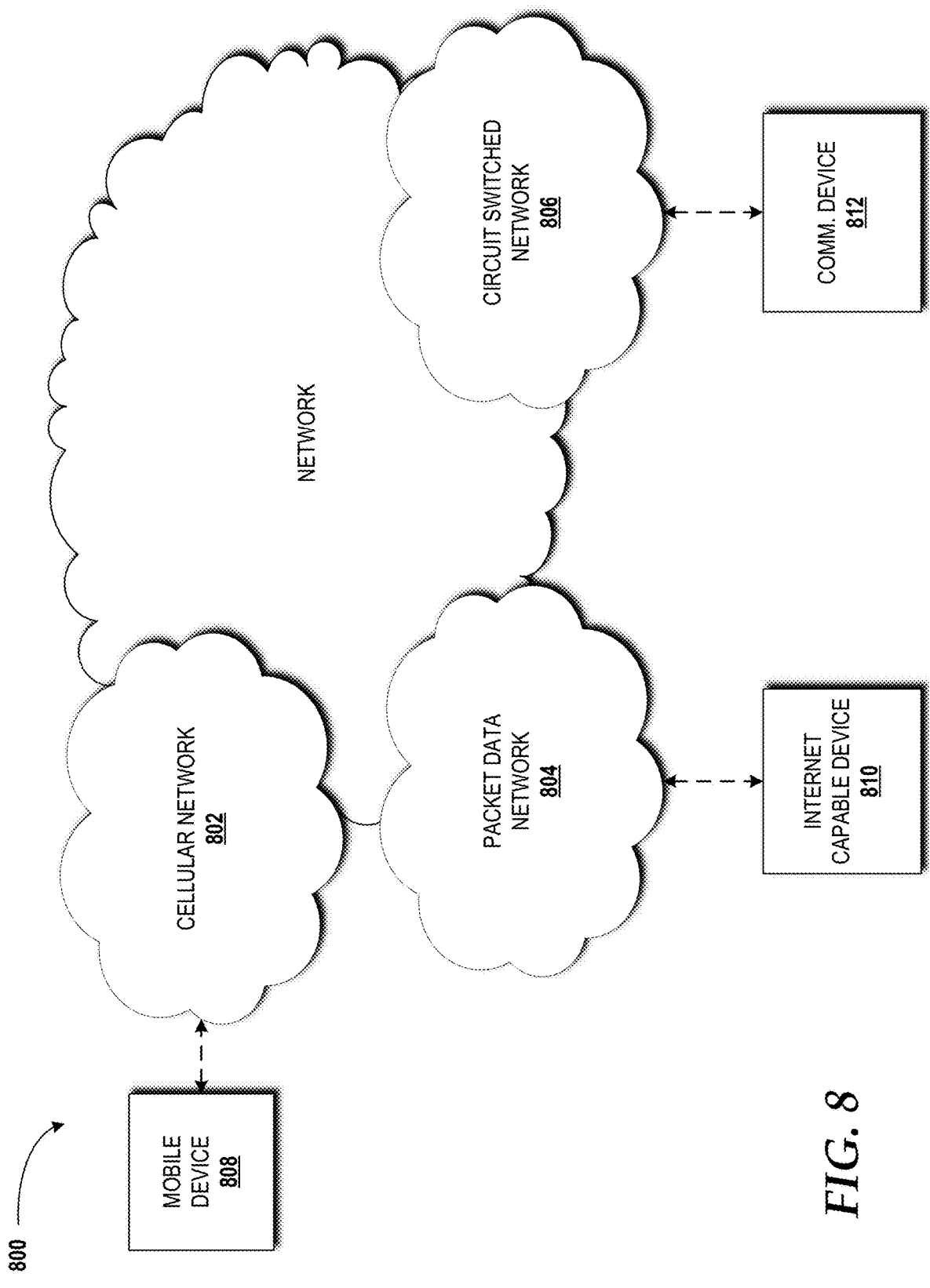
FIG. 8 is a diagram illustrating a network, according to an illustrative embodiment.

Turning now to FIG. 8, details of a network 800 are illustrated, according to an illustrative embodiment. In some embodiments, the network 800 can include the CMSP network 102 and the other network(s) 112. The illustrated network 800 includes a cellular network 802, a packet data network 804, for example, the Internet, and a circuit switched network 806, for example, a public switched telephone network ("PSTN"). The cellular network 802 includes various components such as, but not limited to, base transceiver stations ("BTSs"), NBs or eNBs, combination eNB/gNB, base station controllers ("BSCs"), radio network controllers ("RNCs"), mobile switching centers ("MSCs"), MMEs, short message service centers ("SMSCs"), multimedia messaging service centers ("MMSCs"), home location registers ("HLRs"), HSSs, VLRs"), charging platforms, billing platforms, voicemail platforms, GPRS core network components, location service nodes, an IP Multimedia Subsystem ("IMS"), and the like. The cellular network 802 also includes radios and nodes for receiving and transmitting voice, data, and combinations thereof to and from radio transceivers, networks, the packet data network 804, and the circuit switched network 806.

A mobile communications device 808, such as, for example, the WEA-capable device 108, a cellular telephone, a user equipment, a mobile terminal, a PDA, a laptop computer, a handheld computer, and combinations thereof, can be operatively connected to the cellular network 802. The cellular network 802 can be configured as a 2G GSM network and can provide data communications via GPRS and/or EDGE. Additionally, or alternatively, the cellular network 802 can be configured as a 3G UMTS network and can provide data communications via the HSPA protocol family, for example, HSDPA, EUL (also referred to as HSUPA), and HSPA+. The cellular network 802 also is compatible with 4G mobile communications standards such as LTE, or the like, as well as evolved and future mobile standards.

The packet data network 804 includes various devices, for example, servers, computers, databases, and other devices in communication with one another, as is generally known. The packet data network 804 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 804 includes or is in communication with the Internet. The circuit switched network 804 includes various hardware and software for providing circuit switched communications. The circuit switched network 806 may include, or may be, what is often referred to as a plain old telephone system ("POTS"). The functionality of a circuit switched network 806 or other circuit-switched network are generally known and will not be described herein in detail.

The illustrated cellular network 802 is shown in communication with the packet data network 804 and a circuit switched network 806, though it should be appreciated that this is not necessarily the case. One or more Internet-capable devices 810, for example, a PC, a laptop, a portable device, or another suitable device, can communicate with one or more cellular networks 802, and devices connected thereto, through the packet data network 804. It also should be appreciated that the Internet-capable device 810 can communicate with the packet data network 804 through the circuit switched network 806, the cellular network 802, and/or via other networks (not illustrated).

As illustrated, a communications device 812, for example, a telephone, facsimile machine, modem, computer, or the like, can be in communication with the circuit switched network 806, and therethrough to the packet data network 804 and/or the cellular network 802. It should be appreciated that the communications device 812 can be an Internet-capable device, and can be substantially similar to the Internet-capable device 810. In the specification, the network is used to refer broadly to any combination of the networks 802, 804, 806 shown in FIG. 8.

Figure 9:
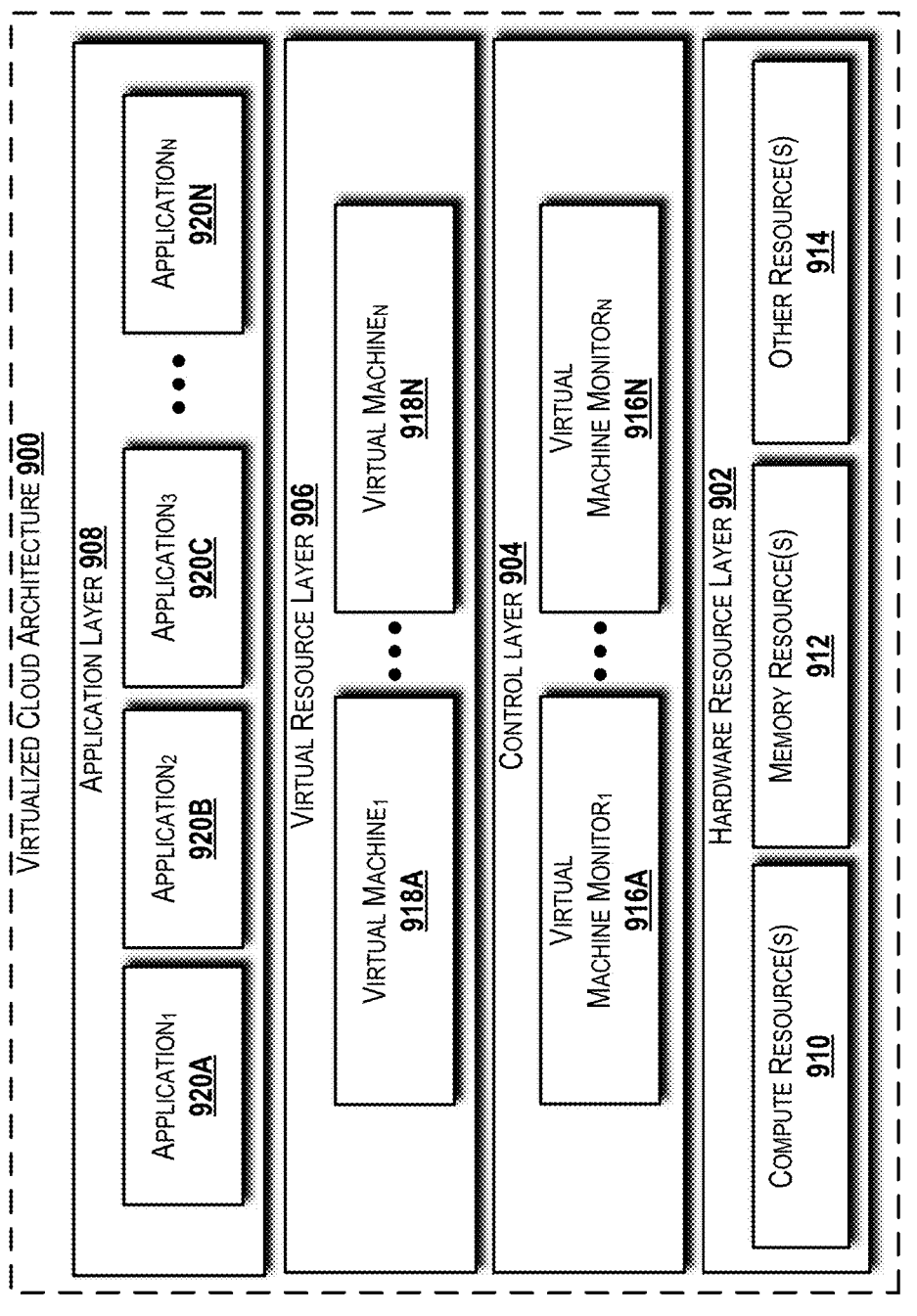
FIG. 9 is a diagram illustrating a virtualized cloud architecture capable of implementing aspects of the embodiments presented herein.

Turning now to FIG. 9, a block diagram illustrating an example virtualized cloud architecture 900 and components thereof will be described, according to an exemplary embodiment. In some embodiments, the virtualized cloud architecture 900 can be utilized to implement, at least in part, the CMSP network 102, the CMAS system 104, the CAP alert origination system 144, portions thereof, and/or combinations thereof. The virtualized cloud architecture 900 is a shared infrastructure that can support multiple services and network applications. The illustrated virtualized cloud architecture 900 includes a hardware resource layer 902, a control layer 904, a virtual resource layer 906, and an application layer 908 that work together to perform operations as will be described in detail herein.

The hardware resource layer 902 provides hardware resources, which, in the illustrated embodiment, include one or more compute resources 910, one or more memory resources 912, and one or more other resources 914. The compute resource(s) 910 can include one or more hardware components that perform computations to process data, and/or to execute computer-executable instructions of one or more application programs, operating systems, and/or other software. The compute resources 910 can include one or more central processing units ("CPUs") configured with one or more processing cores. The compute resources 910 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources 910 can include one or more discrete GPUs. In some other embodiments, the compute resources 910 can include CPU and GPU components that are configured in accordance with a co-processing CPU/GPU computing model, wherein the sequential part of an application executes on the CPU and the computationally-intensive part is accelerated by the GPU. The compute resources 910 can include one or more system-on-chip ("SoC") components along with one or more other components, including, for example, one or more of the memory resources 912, and/or one or more of the other resources 914. In some embodiments, the compute resources 910 can be or can include one or more SNAPDRAGON SoCs, available from QUALCOMM; one or more TEGRA SoCs, available from NVIDIA; one or more HUMMINGBIRD SoCs, available from SAMSUNG; one or more Open Multimedia Application Platform ("OMAP") SoCs, available from TEXAS INSTRUMENTS; one or more customized versions of any of the above SoCs; and/or one or more proprietary SoCs. The compute resources 910 can be or can include one or more hardware components architected in accordance with an advanced reduced instruction set computing ("RISC") machine ("ARM") architecture, available for license from ARM HOLDINGS. Alternatively, the compute resources 910 can be or can include one or more hardware components architected in accordance with an x86 architecture, such an architecture available from INTEL CORPORATION of Mountain View, California, and others. Those skilled in the art will appreciate the implementation of the compute resources 910 can utilize various computation architectures, and as such, the compute resources 910 should not be construed as being limited to any particular computation architecture or combination of computation architectures, including those explicitly disclosed herein.

The memory resource(s) 912 can include one or more hardware components that perform storage operations, including temporary or permanent storage operations. In some embodiments, the memory resource(s) 912 include volatile and/or non-volatile memory implemented in any method or technology for storage of information such as computer-readable instructions, data structures, program modules, or other data disclosed herein.

Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 910.

The other resource(s) 914 can include any other hardware resources that can be utilized by the compute resources(s) 910 and/or the memory resource(s) 912 to perform operations described herein. The other resource(s) 914 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resource layer 902 can be virtualized by one or more virtual machine monitors ("VMMs") 916A-916N (also known as "hypervisors;" hereinafter "VMMs 916") operating within the control layer 904 to manage one or more virtual resources that reside in the virtual resource layer 906. The VMMs 916 can be or can include software, firmware, and/or hardware that alone or in combination with other software, firmware, and/or hardware, manages one or more virtual resources operating within the virtual resource layer 906.

The virtual resources operating within the virtual resource layer 906 can include abstractions of at least a portion of the compute resources 910, the memory resources 912, the other resources 914, or any combination thereof. These abstractions are referred to herein as virtual machines ("VMs"). In the illustrated embodiment, the virtual resource layer 906 includes VMs 918A-918N (hereinafter "VMs 918"). Each of the VMs 918 can execute one or more applications 920A-920N in the application layer 908.

Figure 10:
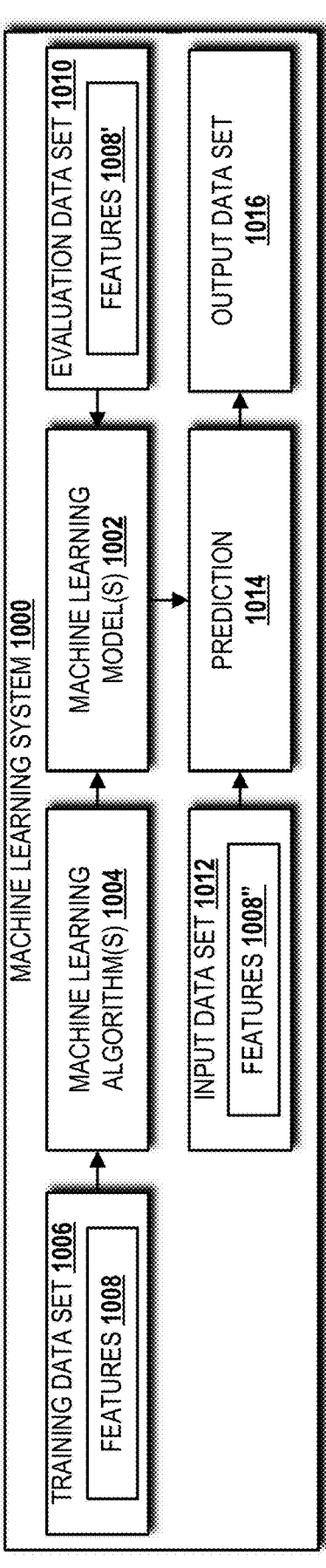
FIG. 10 is a diagram illustrating a machine learning system capable of implementing aspects of the embodiments presented herein.

Turning now to FIG. 10, a machine learning system 1000 capable of implementing aspects of the embodiments disclosed herein will be described. In some embodiments, the event-based WEA function 114 can implement or otherwise utilize a machine learning system such as the machine learning system 1000. The illustrated machine learning system 1000 includes one or more machine learning models 1002. The machine learning models 1002 can include supervised and/or semi-supervised learning models. The machine learning model(s) 1002 can be created by the machine learning system 1000 based upon one or more machine learning algorithms 1004. The machine learning algorithm(s) 1004 can be any existing, well-known algorithm, any proprietary algorithms, or any future machine learning algorithm. Some example machine learning algorithms 1004 include, but are not limited to, gradient descent, linear regression, logistic regression, linear discriminant analysis, classification tree, regression tree, Naive Bayes, K-nearest neighbor, learning vector quantization, support vector machines, and the like. Classification and regression algorithms might find particular applicability to the concepts and technologies disclosed herein. Those skilled in the art will appreciate the applicability of various machine learning algorithms 1004 based upon the problem(s) to be solved by machine learning via the machine learning system 1000.

The machine learning system 1000 can control the creation of the machine learning models 1002 via one or more training parameters. In some embodiments, the training parameters are selected modelers at the direction of an enterprise, for example. Alternatively, in some embodiments, the training parameters are automatically selected based upon data provided in one or more training data sets 1006. The training parameters can include, for example, a learning rate, a model size, a number of training passes, data shuffling, regularization, and/or other training parameters known to those skilled in the art.

The learning rate is a training parameter defined by a constant value. The learning rate affects the speed at which the machine learning algorithm 1004 converges to the optimal weights. The machine learning algorithm 1004 can update the weights for every data example included in the training data set 1006. The size of an update is controlled by the learning rate. A learning rate that is too high might prevent the machine learning algorithm 1004 from converging to the optimal weights. A learning rate that is too low might result in the machine learning algorithm 1004 requiring multiple training passes to converge to the optimal weights.

The model size is regulated by the number of input features ("features") 1008 in the training data set 1006. A greater the number of features 1008 yields a greater number of possible patterns that can be determined from the training data set 1006. The model size should be selected to balance the resources (e.g., compute, memory, storage, etc.) needed for training and the predictive power of the resultant machine learning model 1002.

The number of training passes indicates the number of training passes that the machine learning algorithm 1004 makes over the training data set 1006 during the training process. The number of training passes can be adjusted based, for example, on the size of the training data set 1006, with larger training data sets being exposed to fewer training passes in consideration of time and/or resource utilization.

The effectiveness of the resultant machine learning model 1002 can be increased by multiple training passes.

Data shuffling is a training parameter designed to prevent the machine learning algorithm 1004 from reaching false optimal weights due to the order in which data contained in the training data set 1006 is processed. For example, data provided in rows and columns might be analyzed first row, second row, third row, etc., and thus an optimal weight might be obtained well before a full range of data has been considered. By data shuffling, the data contained in the training data set 1006 can be analyzed more thoroughly and mitigate bias in the resultant machine learning model 1002.

Regularization is a training parameter that helps to prevent the machine learning model 1002 from memorizing training data from the training data set 1006. In other words, the machine learning model 1002 fits the training data set 1006, but the predictive performance of the machine learning model 1002 is not acceptable. Regularization helps the machine learning system 1000 avoid this overfitting/memorization problem by adjusting extreme weight values of the features 1008. For example, a feature that has a small weight value relative to the weight values of the other features in the training data set 1006 can be adjusted to zero.

The machine learning system 1000 can determine model accuracy after training by using one or more evaluation data sets 1010 containing the same features 1008' as the features 1008 in the training data set 1006. This also prevents the machine learning model 1002 from simply memorizing the data contained in the training data set 1006. The number of evaluation passes made by the machine learning system 1000 can be regulated by a target model accuracy that, when reached, ends the evaluation process and the machine learning model 1002 is considered ready for deployment.

After deployment, the machine learning model 1002 can perform a prediction operation ("prediction") 1014 with an input data set 1012 having the same features 1008" as the features 1008 in the training data set 1006 and the features 1008' of the evaluation data set 1010. The results of the prediction 1014 are included in an output data set 1016 consisting of predicted data. The machine learning model 1002 can perform other operations, such as regression, classification, and others. As such, the example illustrated in FIG. 10 should not be construed as being limiting in any way.

Based on the foregoing, it should be appreciated that concepts and technologies directed to event-based WEAs have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A method comprising:

receiving, by a wireless emergency alert-capable device comprising a processor executing an event-based wireless emergency alert function, an event-based wireless emergency alert comprising an event code and an alert content, wherein the event code specifies a nature of an event associated with the event-based wireless emergency alert;

parsing, by the wireless emergency alert-capable device, the event code from the event-based wireless emergency alert;

determining, by the wireless emergency alert-capable device, via the event-based wireless emergency alert function, a wireless emergency alert format for outputting the alert content of the event-based wireless emergency alert based upon the event code, wherein the wireless emergency alert format associated with the event code is defined by a user of the wireless emergency alert-capable device, wherein determining the wireless emergency alert format for outputting the alert content of the event-based wireless emergency alert based upon the event code comprises comparing the event code to a list of event codes, wherein the event codes are associated with wireless emergency alert formats, and wherein a first wireless emergency alert format of the wireless emergency alert formats comprises a first voice for outputting alert content and a second wireless emergency alert format of the wireless emergency alert formats comprises a second voice different from the first voice for outputting alert content; and outputting, by the wireless emergency alert-capable device, the alert content in the wireless emergency alert format.

2. The method of claim 1, wherein the event code identifies a weather-related emergency event.

3. The method of claim 1, wherein the event code identifies a non-weather-related emergency event.

4. The method of claim 1, wherein the wireless emergency alert format comprises an event-specific spoken language, and wherein outputting, by the wireless emergency alert-capable device, the alert content in the wireless emergency alert format comprises outputting, by the wireless emergency alert-capable device, the alert content in the event-specific spoken language via a speaker.

5. The method of claim 1, wherein the wireless emergency alert format comprises an event-specific symbol, and wherein outputting, by the wireless emergency alert-capable device, the alert content in the wireless emergency alert format comprises outputting, by the wireless emergency alert-capable device, the alert content as the event-specific symbol via a display.

6. The method of claim 1, wherein the wireless emergency alert format comprises an event-specific haptic feedback, and wherein outputting, by the wireless emergency alert-capable device, the alert content in the wireless emergency alert format comprises outputting, by the wireless emergency alert-capable device, the alert content as the event-specific haptic feedback via a haptic component.

7. The method of claim 1, wherein each event code of the list of event codes is associated with a different one of the wireless emergency alert formats.

8. A wireless emergency alert-capable device comprising:

a processor; and a memory comprising instructions for an event-based wireless emergency alert function that, when executed by the processor, cause the processor to perform operations comprising receiving an event-based wireless emergency alert comprising an event code and an alert content, wherein the event code specifies a nature of an event associated with the event-based wireless emergency alert, parsing the event code from the event-based wireless emergency alert, determining, via the event-based wireless emergency alert function, a wireless emergency alert format for outputting the alert content of the event-based wireless emergency alert based upon the event code, wherein the wireless emergency alert format associated with the event code is defined by a user of the wireless emergency alert-capable device, wherein determining the wireless emergency alert format for outputting the alert content of the event-based wireless emergency alert based upon the event code comprises comparing the event code to a list of event codes, wherein the event codes are associated with wireless emergency alert formats, and wherein a first wireless emergency alert format of the wireless emergency alert formats comprises a first voice for outputting alert content and a second wireless emergency alert format of the wireless emergency alert formats comprises a second voice different from the first voice for outputting alert content, and outputting the alert content in the wireless emergency alert format.

9. The wireless emergency alert-capable device of claim 8, wherein the event code identifies a weather-related emergency event.

10. The wireless emergency alert-capable device of claim 8, wherein the event code identifies a non-weather-related emergency event.

11. The wireless emergency alert-capable device of claim 8, further comprising a speaker, wherein the wireless emergency alert format comprises an event-specific spoken language, and wherein outputting the alert content in the wireless emergency alert format comprises outputting the alert content in the event-specific spoken language via the speaker.

12. The wireless emergency alert-capable device of claim 8, further comprising a display, wherein the wireless emergency alert format comprises an event-specific symbol, and wherein outputting the alert content in the wireless emergency alert format comprises outputting the alert content as the event-specific symbol via the display.

13. The wireless emergency alert-capable device of claim 8, further comprising a haptic component, wherein the wireless emergency alert format comprises an event-specific haptic feedback, and wherein outputting the alert content in the wireless emergency alert format comprises outputting the alert content as the event-specific haptic feedback via the haptic component.

14. The wireless emergency alert-capable device of claim 8, wherein the memory further comprises instructions for an operating system, and wherein the operating system comprises the event-based wireless emergency alert function.

15. The wireless emergency alert-capable device of claim 8, wherein the memory further comprises instructions for an application, and wherein the application comprises the event-based wireless emergency alert function.

16. A computer-readable storage medium comprising computer-executable instructions for an event-based wireless emergency alert function that, when executed by a processor of a wireless emergency alert-capable device, cause the processor to perform operations comprising:

receiving an event-based wireless emergency alert comprising an event code and an alert content, wherein the event code specifies a nature of an event associated with the event-based wireless emergency alert;

parsing the event code from the event-based wireless emergency alert;

determining a wireless emergency alert format for outputting the alert content of the event-based wireless emergency alert based upon the event code, wherein the wireless emergency alert format associated with the event code is defined by a user of the wireless emergency alert-capable device, wherein determining the wireless emergency alert format for outputting the alert content of the event-based wireless emergency alert based upon the event code comprises comparing the event code to a list of event codes, wherein the event codes are associated with wireless emergency alert formats, and wherein a first wireless emergency alert format of the wireless emergency alert formats comprises a first voice for outputting alert content and a second wireless emergency alert format of the wireless emergency alert formats comprises a second voice different from the first voice for outputting alert content; and outputting the alert content in the wireless emergency alert format.

17. The computer-readable storage medium of claim 16, wherein the wireless emergency alert format comprises an event-specific spoken language, and wherein outputting the alert content in the wireless emergency alert format comprises outputting the alert content in the event-specific spoken language via a speaker.

18. The computer-readable storage medium of claim 16, wherein the wireless emergency alert format comprises an event-specific symbol, and wherein outputting the alert content in the wireless emergency alert format comprises outputting the alert content as the event-specific symbol via a display.

19. The computer-readable storage medium of claim 16, wherein the wireless emergency alert format comprises an event-specific haptic feedback, and wherein outputting the alert content in the wireless emergency alert format comprises outputting the alert content as the event-specific haptic feedback via a haptic component.

* * * * *